(12) United States Patent
Zhou

(10) Patent No.: US 9,897,740 B2
(45) Date of Patent: Feb. 20, 2018

(54) BACKLIGHT MODULE AND DISPLAY DEVICE

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 51 days.

(21) Appl. No.: 15/151,832

(22) Filed: May 11, 2016

(65) Prior Publication Data

US 2017/0261671 A1   Sep. 14, 2017

(30) Foreign Application Priority Data

Mar. 8, 2016   (CN) .......................... 2016 1 0130222

(51) Int. Cl.
*F21V 8/00* (2006.01)
*G02B 6/42* (2006.01)

(52) U.S. Cl.
CPC ........... *G02B 6/005* (2013.01); *G02B 6/0088* (2013.01); *G02B 6/42* (2013.01); *G02B 6/4202* (2013.01)

(58) Field of Classification Search
CPC ........ G02B 6/005; G02B 6/0088; G02B 6/42; G02B 6/0013; G02B 6/4202
See application file for complete search history.

(56) References Cited

U.S. PATENT DOCUMENTS

| | | | | |
|---|---|---|---|---|
| 9,341,763 | B1* | 5/2016 | Fan ...................... | G02B 6/0026 |
| 9,658,381 | B2* | 5/2017 | Fan ...................... | G02B 6/0026 |
| 2012/0294037 | A1* | 11/2012 | Holman .................... | F21V 5/02 |
| | | | | 362/609 |
| 2014/0240644 | A1* | 8/2014 | Abe ...................... | G02B 6/0088 |
| | | | | 349/71 |
| 2015/0070934 | A1* | 3/2015 | Chou .................... | G02B 6/0051 |
| | | | | 362/613 |
| 2016/0266305 | A1* | 9/2016 | Yonezawa ............. | G02F 1/1333 |
| 2017/0017021 | A1* | 1/2017 | Tokinoya ............... | G02B 6/005 |
| 2017/0139099 | A1* | 5/2017 | Zeng ....................... | G02B 6/005 |
| 2017/0160431 | A1* | 6/2017 | You ........................ | G02B 6/005 |
| 2017/0227701 | A1* | 8/2017 | Nishikawa ............. | G02B 6/005 |

* cited by examiner

*Primary Examiner* — Joseph L Williams
*Assistant Examiner* — Jose M Diaz
(74) *Attorney, Agent, or Firm* — Andrew C. Cheng

(57) ABSTRACT

A backlight module includes a light source, a light guide plate, an optical film assembly, and a quantum dot film. The light guide plate includes a light exit surface, a back surface opposite to the light exit surface, and a side surface connected between the light exit surface and the back surface. The light source is arranged adjacent to the side surface of the light guide plate to emit light to the light guide plate. The quantum dot film includes a gamut conversion zone and a gamut ineffective zone located on an outer circumference of the gamut conversion zone. The gamut conversion zone is stacked between the optical film assembly and the light exit surface. The gamut ineffective zone projects outward from an edge of the optical film assembly. The backlight module allows for bezel narrowing, while possessing high color gamut.

18 Claims, 2 Drawing Sheets

BACKLIGHT MODULE AND DISPLAY DEVICE

BACKGROUND OF THE INVENTION

1. Field of the Invention

The present invention relates to the field of display, and more particularly to a backlight module and a display device.

2. The Related Arts

A backlight module provides backlighting to a display module of a display device. The lighting performance of the backlight module directly affects the displaying performance of the display module.

To realize a liquid crystal backlight module of high color gamut, as shown in FIG. 1, a conventional backlight module 1 may involve a quantum dot film 100. However, the quantum dot film 100 has a marginal gamut ineffective zone 10 so that a black edge may appear in the marginal edge of the backlight module 1. Consequently, a width of a bezel of the module 1 must be increased in order to cover the ineffective zone 10. This affects visual performance and market competition power of products.

SUMMARY OF THE INVENTION

The present invention provides a backlight module that allows for bezel narrowing, while possessing high color gamut.

The present invention provides a backlight module, which comprises a light source, a light guide plate, an optical film assembly, and a quantum dot film. The light guide plate comprises a light exit surface, a back surface opposite to the light exit surface, and a side surface connected between the light exit surface and the back surface. The light source is arranged adjacent to the side surface of the light guide plate for emitting light toward the light guide plate. The quantum dot film comprises a gamut conversion zone and a gamut ineffective zone located on an outer circumference of the gamut conversion zone. The gamut conversion zone is stacked between the optical film assembly and the light exit surface. The gamut ineffective zone projects outward from an edge of the optical film assembly.

In the above backlight module, a mold frame is further included and is arranged to surround around the light guide plate. The optical film assembly and/or the quantum dot film is mounted to the mold frame.

In the above backlight module, a backplane is further included and receives the light guide plate, the light source, and the mold frame therein. The backplane comprises a bottom plate and a side plate vertically extending from the bottom plate. The light guide plate is positioned on the bottom plate. The side plate surrounds outside and around the mold frame.

In the above backlight module, at one side associated with the light source, the optical film assembly and the quantum dot film have ends that are in alignment with each other in a direction perpendicular to the light exit surface.

In the above backlight module, the side plate of the backplane comprises an inside surface and an outside surface opposite to each other. The inside surface is positioned against the mold frame. The gamut ineffective zone of the quantum dot film has an outer edge that is retracted inwardly with respect to the outside surface of the side plate by a distance of 0-0.2 mm.

In the above backlight module, the gamut ineffective zone of the quantum dot film comprises a first surface and a second surface opposite to each other. The outer edge is connected between the first surface and the second surface. The first surface receives a positioning plate arranged thereon for pre-positioning of the optical film assembly. The second surface is securely connected to the mold frame.

In the above backlight module, the positioning plate is in the form of a U-shaped and the positioning plate has an opening facing the light source.

In the above backlight module, the light source comprises a light tube and a retention plate arranged on the light tube to fix the light tube. The light tube is arranged to correspond to the side surface of the light guide plate.

In the above backlight module, at the side associated with the light source, the optical film assembly is securely connected, by adhesives, to the retention plate of the light source and/or the mold frame.

The present invention also provides a display device, which comprises the above described backlight module.

Compared to the prior art, the present invention provides a quantum dot film having a gamut conversion zone stacked between an optical film assembly and a light exit surface of a light guide plate and a gamut ineffective zone projecting outward relative to an edge of the optical film assembly and a side surface of the light guide plate so as to reduce a width of a part of a bezel that covers and shields the gamut ineffective zone of the quantum dot film so that a backlight module, while allowing for narrowing of the bezel of the backlight module, possesses high color gamut.

BRIEF DESCRIPTION OF THE DRAWINGS

To more clearly explain the technical solution proposed in an embodiment of the present invention and that of the prior art, a brief description of the drawings that are necessary for describing embodiments is given as follows. It is obvious that the drawings that will be described below show only some embodiments. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to a technical solution of embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Figure 1:
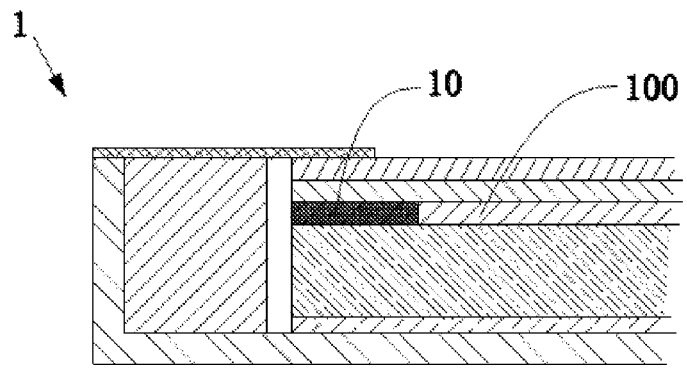
FIG. 1 is a schematic cross-sectional view illustrating a non-light-source side of a conventional backlight module.
Figure 2:
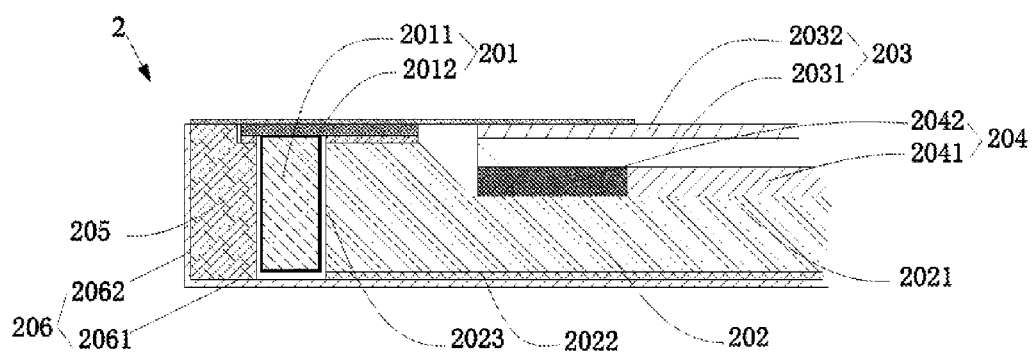
FIG. 2 is a schematic cross-sectional view illustrating a light-source side of a backlight module according to the present invention.

Referring to FIG. 2, a light-source side of a backlight module 2 according to the present invention is shown. The backlight module 2 comprises a light source 201, a light guide plate 202, an optical film assembly 203, a quantum dot film 204, a mold frame 205, and a backplane 206. In the instant embodiment, the backlight module is a side-edge backlight module. The light source 201 comprises a light tube 2011 and a retention plate 2012 that is arranged on the light tube 2011 to fix the light tube 2011. As shown in FIG. 2, the retention plate 2012 has an undersurface that is securely connected to the light guide plate 202 and the mold frame 205 by a double-sided adhesive tape. It is readily appreciated that the light tube 201 can be a light-emitting diode (LED) light or other light emission sources, such as a cold cathode fluorescent lamp (CCFL). The retention plate 2012 is formed of for example an FPC (Flexible Printed Circuit) material.

The light guide plate 202 functions to guide out light emitting from the light source 201. The light guide plate 202 comprises a light exit surface 2021, a back surface 2022 opposite to the light exit surface 2021, and a side surface 2023 connected between the light exit surface 2021 and the back surface 2022. The light source 201 is arranged adjacent to the side surface 2023 of the light guide plate 202 to irradiate light toward the light guide plate 202. The optical film assembly 203 and the quantum dot film 204 are sequentially stacked on the light exit surface 2021 of the light guide plate 202 and, specifically, the quantum dot film 204 is laid flat on the light guide plate 202 to amply absorb the light emitting from the light guide plate 202. The optical film assembly 203 is arranged on the quantum dot film 204. In the instant embodiment, the quantum dot film 204 comprises a gamut conversion zone 2041 and a gamut ineffective zone 2042 that is located on an outer circumference of the gamut conversion zone 2041. The optical film assembly 203 comprises a diffusion plate 2031 and a prism plate 2032 that are sequentially stacked. Since a part of a bezel located on the side associated with the light source 201 must cover and shield the light source 201, the part of the bezel of this side has a relatively large width and may cover and shield the gamut ineffective zone 2042 of the quantum dot film. Thus, at the side associated with the light source 201, ends of the optical film assembly 203 and the quantum dot film 204 are in alignment with each other in a direction perpendicular to the light exit surface 2021.

The mold frame 205 is arranged to surround the light guide plate 202. An end of the prism plate 2032 of the optical film assembly 203 that is adjacent to the light source 201 is securely connected by means of light-shielding bonding 207 to the retention plate 2012 of the light source 201 and/or the mold frame 205. The backplane 206 is in the form of one-side-open box and the backplane 206 comprises a bottom plate 2061 and a side plate 2062 vertically extending from the bottom plate 2061. The bottom plate 2061 receives and supports the light guide plate 202 to be positioned thereon and the side plate 2062 surrounds outside and around the mold frame 205.

Figure 3:
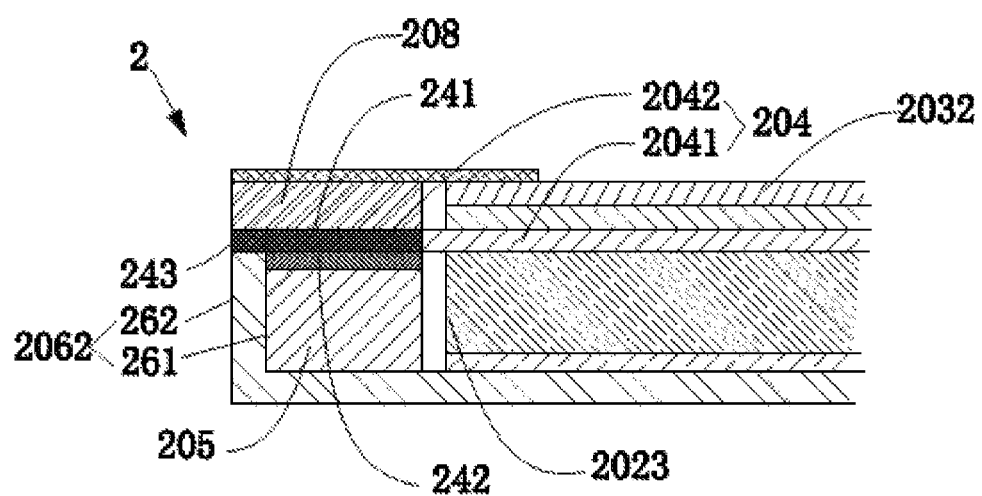
FIG. 3 is a schematic cross-sectional view illustrating a non-light-source side of the backlight module according to the present invention.

Referring to FIG. 3, a non-light-source side of the backlight module 2 according to the present invention is shown. The gamut ineffective zone 2042 of the quantum dot film 204 projects outwards beyond an edge of the optical film assembly 203. The gamut ineffective zone 2042 comprises a first surface 241 and a second surface 242 that are opposite to each other and an outer edge 243 connected between the first surface 241 and the second surface 242. The first surface 2041 receives a positioning plate 208 that functions to pre-position the optical film assembly 203 to be positioned thereon. The second surface 2042 is securely connected, through a double-sided adhesive tape, to the mold frame 205. The positioning plate 208 has a lower surface that is adhesively attached to the gamut ineffective zone 2042 of the quantum dot film 204 and an upper surface that is securely connected, through a double-sided adhesive tape, to an end of the prism plate 2032 of the optical film assembly 203 that is distant from the light source 201. In the instant embodiment, the positioning plate is a U-shaped plate having an opening formed in one side and the opening faces the light source 201. In an assembly process of the backlight module 2, the positioning plate 208 is adhesively attached to the quantum dot film 204 in advance such that the positioning plate 208 serves as a reference for positioning when the optical film assembly 203 is positioned on the quantum dot film 204 thereby achieving pre-positioning for the optical film assembly 203. The positioning plate 208 can be assembled with a known, main-stream assembly process so that no additional assembly equipment is necessary. The side plate 2062 of the backplane 206 comprises an inside surface 261 and an outside surface 262 that are opposite to each other. The inside surface 261 is positioned against the mold frame 205, and in the side not associated with the light source 201, the outer edge 243 of the gamut ineffective zone 2042 of the quantum dot film 204 is retracted inwardly with respect to the outside surface 262 of the side plate 2062 by 0-0.2 mm, preferably being retracted inwardly by 0.1-0.2 mm, so that, compared to the prior art, the backlight module of the present invention may use a relatively narrow bezel to cover and shield the gamut ineffective zone 2042 of the quantum dot film 204, whereby the backlight module allows for bezel narrowing, while possessing high color gamut.

It is appreciated that the light-source side shown in FIG. 2 and the non-light-source side shown in FIG. 3 are arranged opposite to each other, and the remaining sides of the backlight module 2 may be structured by referring to the structure illustrated in FIG. 3. It is noted that the present invention is described by exemplifying a side-edge backlight module for illustration purpose, but the present invention is applicable to a structural arrangement of a direct backlight module.

The present invention has been described with reference to the preferred embodiments. However, it is noted that those skilled in the art would appreciates that various improvements and modifications are still available without departing from the scope of the present invention and such improvements and modifications are considered within the scope of protection of the present invention.

What is claimed is:

1. A backlight module, comprising a light source, a light guide plate, an optical film assembly, and a quantum dot film, the light guide plate comprising a light exit surface, a back surface opposite to the light exit surface, and a side surface connected between the light exit surface and the back surface, the light source being arranged adjacent to the side surface of the light guide plate for emitting light toward the light guide plate, the quantum dot film comprising a gamut conversion zone and a gamut ineffective zone located on an outer circumference of the gamut conversion zone, the gamut conversion zone being stacked between the optical film assembly and the light exit surface, the gamut ineffective zone projecting outward from an edge of the optical film assembly;

wherein the gamut ineffective zone that projects outward from the edge of the optical film assembly is located outboard of the light guide plate, while the gamut effective zone that is stacked between the optical film assembly and the light exit surface of the light guide plate is located inboard and on the light guide plate.

2. The backlight module as claimed in claim 1 further comprising a mold frame that is arranged to surround around the light guide plate, wherein the optical film assembly is mounted to the mold frame or the optical film assembly and the quantum dot film mounted to the mold frame.

3. The backlight module as claimed in claim 2 further comprising a backplane that receives the light guide plate, the light source, and the mold frame therein, the backplane comprising a bottom plate and a side plate vertically extending from the bottom plate, the light guide plate being positioned on the bottom plate, the side plate surrounding outside and around the mold frame.

4. The backlight module as claimed in claim 3, wherein at one side associated with the light source, the optical film assembly and the quantum dot film have ends that are in alignment with each other in a direction perpendicular to the light exit surface.

5. The backlight module as claimed in claim 4, wherein the side plate of the backplane comprises an inside surface and an outside surface opposite to each other, the inside surface being positioned against the mold frame, the gamut ineffective zone of the quantum dot film having an outer edge that is retracted inwardly with respect to the outside surface of the side plate by a distance of 0-0.2 mm.

6. The backlight module as claimed in claim 5, wherein the gamut ineffective zone of the quantum dot film comprises a first surface and a second surface opposite to each other, the outer edge being connected between the first surface and the second surface, the first surface receiving a positioning plate arranged thereon for pre-positioning of the optical film assembly, the second surface being securely connected to the mold frame.

7. The backlight module as claimed in claim 6, wherein the positioning plate is in the form of a U-shaped, the positioning plate having an opening facing the light source.

8. The backlight module as claimed in claim 7, wherein the light source comprises a light tube and a retention plate arranged on the light tube to fix the light tube, the light tube being arranged to correspond to the side surface of the light guide plate.

9. The backlight module as claimed in claim 8, wherein at the side associated with the light source, the optical film assembly is securely connected, by adhesives, to the retention plate of the light source and/or the mold frame.

10. A display device comprising the backlight module as claimed in claim 1.

11. A backlight module, comprising a light source, a light guide plate, an optical film assembly, and a quantum dot film, the light guide plate comprising a light exit surface, a back surface opposite to the light exit surface, and a side surface connected between the light exit surface and the back surface, the light source being arranged adjacent to the side surface of the light guide plate for emitting light toward the light guide plate, the quantum dot film comprising a gamut conversion zone and a gamut ineffective zone located on an outer circumference of the gamut conversion zone, the gamut conversion zone being stacked between the optical film assembly and the light exit surface, the gamut ineffective zone projecting outward from an edge of the optical film assembly;

wherein the gamut ineffective zone of the quantum dot film comprises a first surface and a second surface opposite to each other, and an outer edge connected between the first surface and the second surface, the first surface receiving a positioning plate arranged thereon for pre-positioning of the optical film assembly, wherein the positioning plate is in the form of a U-shaped, the positioning plate having an opening facing the light source.

12. The backlight module as claimed in claim 11 further comprising a mold frame that is arranged to surround around the light guide plate, wherein the optical film assembly is mounted to the mold frame or the optical film assembly and the quantum dot film mounted to the mold frame.

13. The backlight module as claimed in claim 12 further comprising a backplane that receives the light guide plate, the light source, and the mold frame therein, the backplane comprising a bottom plate and a side plate vertically extending from the bottom plate, the light guide plate being positioned on the bottom plate, the side plate surrounding outside and around the mold frame.

14. The backlight module as claimed in claim 13, wherein at one side associated with the light source, the optical film assembly and the quantum dot film have ends that are in alignment with each other in a direction perpendicular to the light exit surface.

15. The backlight module as claimed in claim 14, wherein the side plate of the backplane comprises an inside surface and an outside surface opposite to each other, the inside surface being positioned against the mold frame, the outer edge of the gamut ineffective zone of the quantum dot film being retracted inwardly with respect to the outside surface of the side plate by a distance of 0-0.2 mm.

16. The backlight module as claimed in claim 15, wherein the second surface of the gamut ineffective zone of the quantum dot film is securely connected to the mold frame.

17. The backlight module as claimed in claim 11, wherein the light source comprises a light tube and a retention plate arranged on the light tube to fix the light tube, the light tube being arranged to correspond to the side surface of the light guide plate.

18. The backlight module as claimed in claim 17, wherein at the side associated with the light source, the optical film assembly is securely connected, by adhesives, to the retention plate of the light source or the retention plate of the light source and the mold frame.

* * * * *